United States Patent [19]

Schaetzer et al.

[11] Patent Number: 4,537,598
[45] Date of Patent: Aug. 27, 1985

[54] PROCESS FOR TRICHROMATIC DYEING OR PRINTING OF POLYAMIDE

[75] Inventors: Harry Schaetzer, Wehr, Fed. Rep. of Germany; Helmut Raisin, Riehen; Dieter Mäusezahl, Biel-Benken, both of Switzerland

[73] Assignee: Ciba-Geigy Corporation, Ardsley, N.Y.

[21] Appl. No.: 614,222

[22] Filed: May 24, 1984

[30] Foreign Application Priority Data

May 25, 1983 [CH] Switzerland .......... 2838/83

[51] Int. Cl.$^3$ .......... C09B 67/22; D06P 3/06
[52] U.S. Cl. .......... 8/641; 8/643; 8/681; 8/683; 8/680; 8/924; 8/929; 8/917
[58] Field of Search .......... 8/641, 643

[56] References Cited

U.S. PATENT DOCUMENTS

| | | | |
|---|---|---|---|
| 3,713,768 | 1/1973 | Wegmuller | 8/586 |
| 4,146,363 | 3/1979 | Harms et al. | 8/641 |
| 4,312,808 | 1/1982 | Lienhard et al. | 260/198 |
| 4,365,967 | 12/1982 | Guth et al. | 8/477 |
| 4,378,970 | 4/1983 | Lienhard et al. | 8/683 |
| 4,381,186 | 4/1983 | Magni et al. | 8/620 |
| 4,396,393 | 8/1983 | Schaetzer et al. | 8/643 |
| 4,402,704 | 9/1983 | Raisin et al. | 8/641 |
| 4,445,905 | 5/1984 | Schaetzer et al. | 8/641 |

FOREIGN PATENT DOCUMENTS

| | | |
|---|---|---|
| 99859 | 2/1984 | European Pat. Off. |
| 2623178 | 2/1977 | Fed. Rep. of Germany |
| 1315237 | 5/1973 | United Kingdom |
| 1396126 | 6/1975 | United Kingdom |
| 1579414 | 11/1980 | United Kingdom |

*Primary Examiner*—A. Lionel Clingman
*Attorney, Agent, or Firm*—Wenderoth, Lind & Ponack

[57] ABSTRACT

A process for dyeing or printing natural and synthetic polyamide material by the trichromatic technique, which comprises the use of a red dye of the formula (1) defined in the specification, or a mixture of the red dye of the formula (1) with a red dye of the formula (2) together with at least one yellow or orange dye of the formula (3), or a mixture of at least one yellow or orange dye of the formula (3) with a yellow dye of the formula (4) and at least one blue dye of the formula (5). The process of the invention is suitable for dyeing natural or synthetic polyamide material from an aqueous liquor or for printing with printing pastes. It is particularly suitable for dyeing from short liquors.

18 Claims, No Drawings

PROCESS FOR TRICHROMATIC DYEING OR PRINTING OF POLYAMIDE

It is the object of the present invention to provide a process for dyeing and printing natural and synthetic polyamide material with dyes suitable for combination dyeing by the trichromatic technique. The dyes to be used in the process of this invention shall have a level colour build-up, while at the same time ensuring a constant shade at different concentrations, and they shall also have good compatibility. It has now been found that the process of this invention meets these requirements.

According, the present invention relates to a process for dyeing or printing natural and synthetic polyamide materials by the trichromatic dyeing technique with mixtures of dyes, which process comprises the use of a red dye of the formula

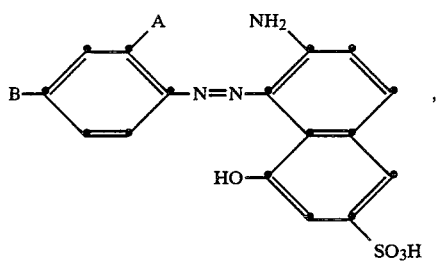

wherein A is hydrogen, unsubstituted or substituted $C_1$-$C_4$alkyl,

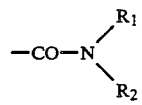

or $-SO_2R_3$, wherein $R_1$ is $C_1$-$C_4$alkyl, $R_2$ is unsubstituted or substituted $C_5$-$C_7$cycloalkyl or unsubstituted or substituted phenyl, and $R_3$ is unsubstituted or substituted phenyl or unsubstituted or substituted phenoxy, and B is hydrogen, halogen, $C_2$-$C_4$alkanoylamino, $C_5$-$C_8$cycloalkoxycarbonylamino, $C_1$-$C_4$alkoxycarbonylamino, $C_1$-$C_4$alkylsulfonylamino or unsubstituted or substituted phenylsulfonylamino, or a mixture of the red dye of the formula (1) with a red dye of the formula

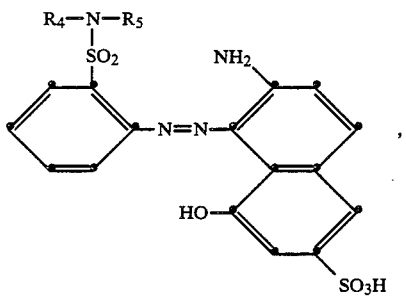

wherein $R_4$ is methyl or ethyl and $R_5$ is cyclohexyl or phenyl, together with at least one yellow or orange dye of the formula

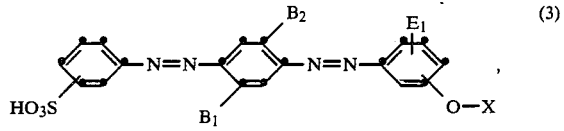

wherein $B_1$, $B_2$ and $E_1$ are hydrogen, $C_1$-$C_4$alkyl or $C_1$-$C_4$alkoxy, and X is straight chain or branched $C_1$-$C_4$alkyl or straight chain or branched $C_2$-$C_4$hydroxyalkyl, or a mixture of at least one yellow or orange dye of the formula (3) with a yellow dye of the formula

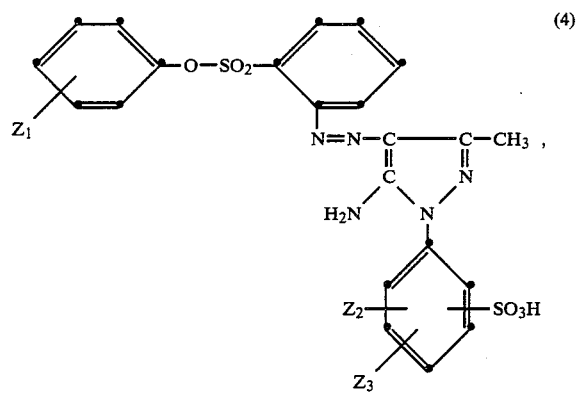

wherein $Z_1$, $Z_2$ and $Z_3$ are independently hydrogen, halogen, $C_1$-$C_4$alkyl or $C_1$-$C_4$alkoxy, and at least one blue dye of the formula

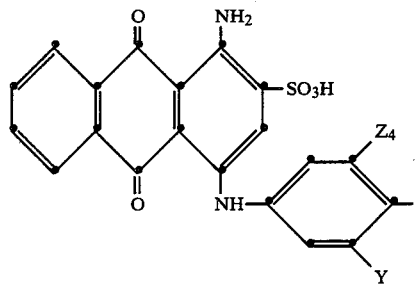

wherein one Y is hydrogen or methyl and the other Y is $C_2$-$C_4$alkanoylamino or $C_2$-$C_4$hydroxyalkylsulfamoyl, and $Z_4$ is hydrogen or methyl.

By the trichromatic dyeing technique is meant the additive blending of suitably chosen yellow or orange, red and blue dyes with which each desired shade of the visible colour spectrum may be adjusted by appropriate choice of the quantity ratios.

Suitable alkyl radicals A, $B_1$, $B_2$, $E_1$, $R_1$, X, $Z_1$, $Z_2$ and $Z_3$ in formulae (1), (3) and (4) are, independently of one another, straight chain or branched alkyl radicals, for example methyl, ethyl, propyl, isopropyl, butyl, sec-butyl, isobutyl and tert-butyl.

The alkyl radical A may be substituted e.g. by halogen such as chlorine or bromine and, in particular, fluorine. The alkyl radical A is preferably a $C_1$-$C_4$perfluoroalkyl radical, most preferably the trifluoromethyl radical.

A suitable $C_5$-$C_7$cycloalkyl radical $R_2$ is e.g. the cyclohexyl radical or an alkyl-substituted, for example a methyl-substituted, cyclohexyl radical.

An unsubstituted or substituted phenyl radical R₂ or R₃ is a phenyl radical which is substituted by $C_1$-$C_4$alkyl, $C_1$-$C_4$alkoxy or halogen, but is preferably an unsubstituted phenyl radical.

An unsubstituted or substituted phenoxy radical R₃ may be a phenoxy radical which is substituted by $C_1$-$C_4$alkyl, preferably methyl, or $C_1$-$C_4$alkoxy, or by halogen, preferably chlorine. A phenoxy radical R₃ is preferably an unsubstituted or a chlorine-substituted phenoxy radical.

B, $Z_1$, $Z_2$ and $Z_3$ as halogen in formulae (1) and (4) may be fluorine or bromine and preferably chlorine.

B and Y as $C_2$-$C_4$alkanoylamino in formulae (1) and (5) may be the acetylamino, propionylamino or butyrylamino radical.

B as $C_5$-$C_8$cycloalkoxycarbonylamino is in particular the cyclohexyloxycarbonylamino radical.

B as $C_1$-$C_4$alkylsulfonylamino is the methylsulfonylamino, ethylsulfonylamino, propylsulfonylamino, butylsulfonylamino, tert-butylsulfonylamino, isobutylsulfonylamino or sec-butylsulfonylamino radical.

B as a phenylsulfonylamino radical may be a phenylsulfonylamino radical which is substituted by $C_1$-$C_4$alkyl, $C_1$-$C_4$alkoxy or halogen, but is preferably an unsubstituted or a methyl-substituted phenylsulfonylamino radical.

Suitable alkoxy radicals for $B_1$, $B_2$, $E_1$, $Z_1$, $Z_2$ and $Z_3$ in formulae (3) and (4) are e.g. the methoxy, ethoxy, propoxy, isopropoxy, butoxy, sec-butoxy, isobutoxy or tert-butoxy radical.

A suitable hydroxyalkyl radical X in formula (3) is a straight chain or branched hydroxyalkyl radical, for example the β-hydroxyethyl, β-hydroxypropyl, β-hydroxybutyl or α-ethyl-β-hydroxyethyl radical.

A $C_2$-$C_4$hydroxyalkylsulfamoyl radical Y in formula (5) is e.g. the β-hydroxyethylsulfamoyl, β-hydroxypropylsulfamoyl, γ-hydroxypropylsulfamoyl or the β-hydroxybutylsulfamoyl radical.

If mixtures of the red dyes of the formulae (1) and (2) are used in the process of this invention, the ratio of dyes of the formula (1) to those of the formula (2) is 90:10 to 10:90 and preferably 70:30 to 30:70.

Important process variants comprise using:

(a) a red dye of the formula (1), wherein A is hydrogen, methyl, trifluoromethyl,

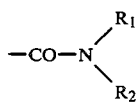

or —SO₂R₃, in which R₁ is methyl or ethyl, R₂ is cyclohexyl or phenyl, and R₃ is phenyl, methylphenyl, phenoxy or chlorophenoxy, and B is hydrogen, chlorine, acetylamino, propionylamino, cyclohexyloxycarbonylamino, phenylsulfonylamino or methylphenylsulfonylamino, with the proviso that A and B together are not both hydrogen;

(b) a red dye of the formula (1), wherein A and B are as defined in (a), together with the red dye of the formula

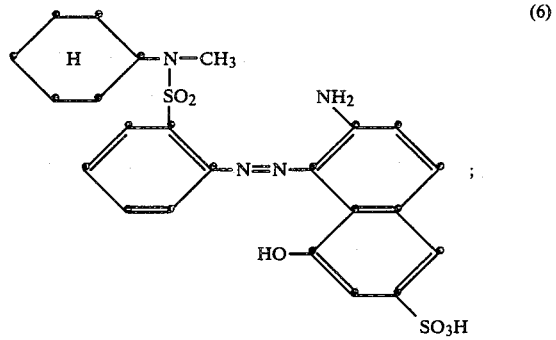

(c) a red dye of the formula (1), wherein A and B are as defined in (a), together with the red dye of the formula

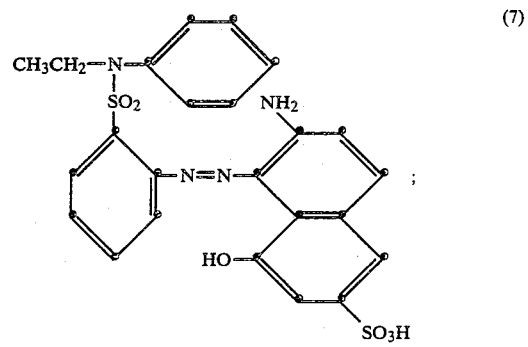

(d) a red dye of the formula (1), wherein A is hydrogen, phenylsulfonyl, phenoxysulfonyl or trifluoromethyl, and B is hydrogen, acetylamino or cyclohexyloxycarbonylamino;

(e) a red dye of the formula (1) wherein A is hydrogen, and B is acetylamino or cyclohexyloxycarbonylamino, or A is trifluoromethyl and B is acetylamino, or A is phenylsulfonyl or phenoxysulfonyl, and B is hydrogen.

As yellow or orange dye of the formula (3) it is preferred to use a dye of the formula

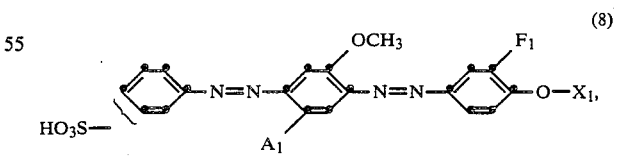

wherein $A_1$ is hydrogen or methyl, $F_1$ is hydrogen or methyl and $X_1$ is methyl, ethyl, β-hydroxyethyl, β-hydroxypropyl, β-hydroxybutyl or α-ethyl-β-hydroxyethyl.

As dye of the formule (4) it is preferred to use a dye of the formula

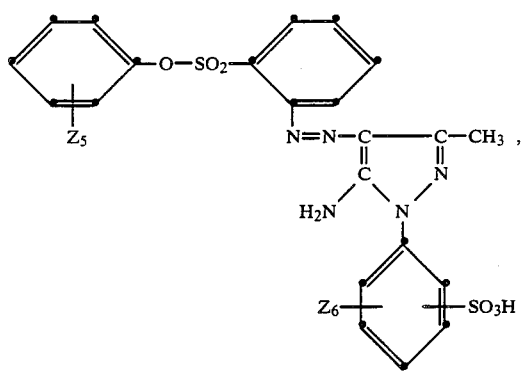

wherein each of $Z_5$ and $Z_6$ independently is hydrogen, methyl or chlorine.

It is particularly preferred to use the yellow dye of the formula

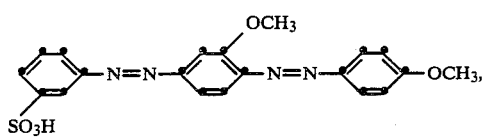

a mixture of the yellow dye of the formula (10) with the orange dye of the formula

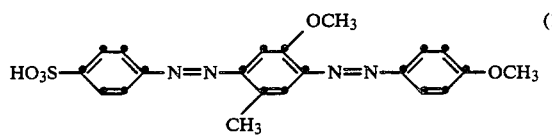

or a mixture of the dyes of the formulae (10) and (11) with the dye of the formula

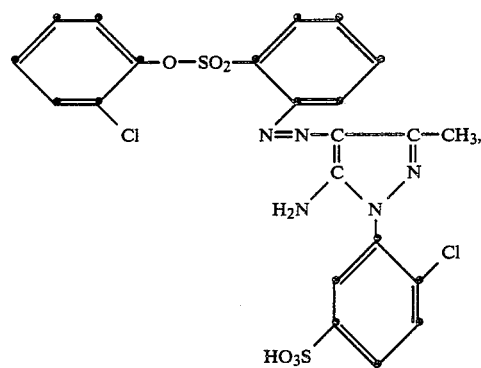

the ratio of the dyes of the formulae (10) and (11) being 60:40 to 40:60 and preferably 1:1, and the ratio of the dyes of the formulae (10), (11) and (12) being 60:20:20, 20:60:20 to 20:20:60 and preferably 1:1:1.

As blue dye of the formula (5) it is preferred to use a dye of the formula

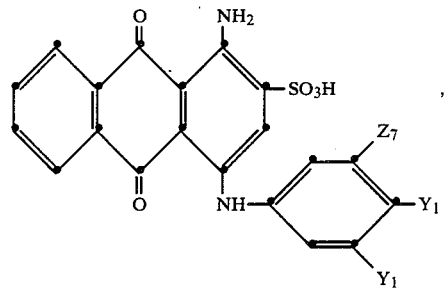

wherein one $Y_1$ is hydrogen or methyl and the other $Y_1$ is acetylamino, propionylamino or $C_2$-$C_4$hydroxyalkylsulfamoyl, and $Z_7$ is hydrogen or methyl, or a mixture of the blue dyes of the formulae

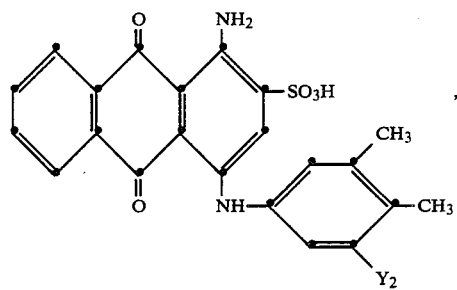

wherein $Y_2$ is a $C_2$-$C_4$hydroxyalkylsulfamoyl radical, and

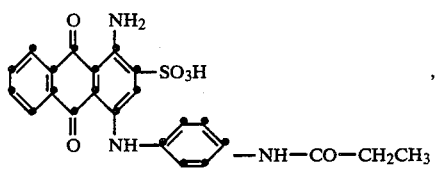

and, in particular, the dyes of the formulae

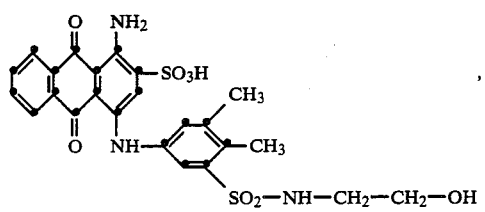

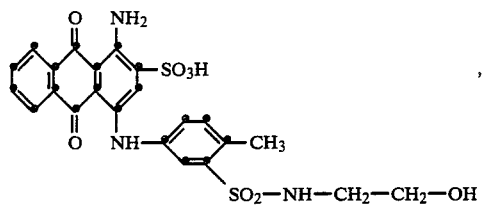

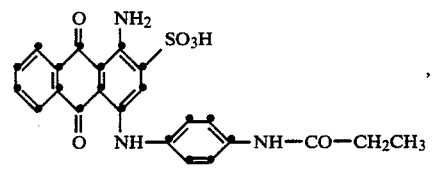

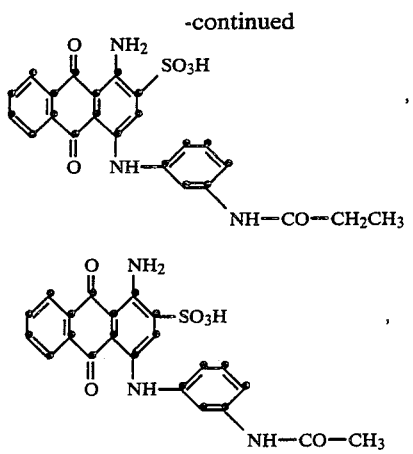

or a mixture of a dye of the formula (16) or (17) with a dye of the formula (18) or (19).

The particularly preferred process variants comprise using a red dye of the formula (1), wherein A is hydrogen and B is acetylamino or cyclohexyloxycarbonylamino, or A is trifluoromethyl and B is acetylamino, or A is phenylsulfonyl or phenoxysulfonyl and B is hydrogen, optionally in admixture with a red dye of the formula (2), wherein $R_4$ is methyl and $R_5$ is cyclohexyl, or $R_4$ is ethyl and $R_5$ is phenyl, together with the yellow dye of the formula (10) or with a mixture of the yellow dye of the formula (10) and the orange dye of the formula (11), or with a mixture of the dyes of the formulae (10) and (11) with the dye of the formula (12), the ratio of the dyes of the formulae (10) to (12) being 1:1 or 1:1:1, and with one of the blue dyes of the formulae (16) and (20) or with a mixture of the blue dye of the formula (16) with a dye of the formula (15), the ratio of the dyes of the formulae (16) and (15) being 60:40 to 40:60.

The most preferred process variant comprises using a red dye of the formula (1), wherein A is trifluoromethyl and B is acetylamino, together with the yellow dye of the formula (10) or with the orange dye of the formulae (11) or with a mixture of the yellow or orange dyes of the formulae (10), (11) and (12), the ratio of the dyes of the formulae (10) to (12) being 1:1:1, and with one of the blue dyes of the formulae (16) and (20) or with a mixture of the blue dye of the formula (16) with the blue dye of the formula (18), the ratio of the dyes of the formulae (16) and (18) being 60:40 to 40:60.

Another preferred process variant comprises using a red dye of the formula (1) together with at least one yellow or orange dye of the formula (3) or with a mixture of at least one yellow or orange dye of the formula (3) with a yellow dye of the formula (4) and at least one blue dye of the formula (5).

The dyes employed in the process for trichromatic dyeing or printing are known or they may be prepared by methods similar to known ones. For example, the dyes of the formulae (1) and (2) may be obtained in accordance with the particulars of German patent specifications Nos. 702 932 and 2 063 907 and the German Offenlegungsschrift No. 2 712 170, those of the formula (5) in accordance with the particulars of U.S. Pat. Nos. 3,778,453 and 1,927,125, and those of the formulae (3) and (4) in accordance with the particulars of German Offenlegungsschrift No. 2 142 412 and German Auslegeschrift No. 1 100 846.

If mixtures of dyes are used in the process of this invention, these may be prepared by mixing the individual dyes. Mixing is effected e.g. in suitable mills, e.g. ball mills and disc attrition mills, as well as in kneaders or mixers. Further, the dyestuff mixtures may be obtained by spray drying the aqueous dyestuff mixtures.

The dyes employed in the process of the invention are either in the form of their free sulfonic acids or, preferably, of their salts.

Examples of suitable salts are the alkali metal salts, alkaline earth metal salts or ammonium salts, or the salts of an organic amine. Typical examples are the sodium, lithium, potassium or ammonium salts or the salt of triethanolamine.

The dyes employed in the process of the invention usually contain further auxiliaries, e.g. sodium chloride or dextrin.

The trichromatic dyeing or printing process of this invention is susceptible of application to conventional dyeing or printing methods. In addition to containing water and the dyes, the dye liquors or printing pastes may contain further auxiliaries, e.g. wetting agents, antifoams, levelling agents or agents which influence the characteristics of the textile material, e.g. softeners, flameproofing additives, or dirt, water and oil repellents, as well as water softeners and natural or synthetic thickeners, e.g. alginates and cellulose ethers.

The process of this invention is especially suitable for dyeing from short liquors, e.g. in continuous dyeing or discontinuous and continuous foam dyeing processes.

In trichromatic dyeing or printing, the dyes employed in the process of this invention are distinguished by level colour build-up, good exhaustion properties, good constancy of shade even at different concentrations, good fastness properties, and in particular by very good compatibility.

The process of this invention is suitable for dyeing or printing both natural polyamide material, e.g. wool, and, in particular, synthetic polyamide material, e.g. perlon or nylon, and is suitable for dyeing or printing blends or yarns of wool and synthetic polyamide. The textile material may be in the most widely different forms of processing, e.g. in the form of fibre, yarn, wovens or knits and, in particular, of carpets.

In the following Examples, parts are by weight. The relationship between parts by weight and parts by volume is the same as that between the gram and the cubic centimeter.

EXAMPLE 1

10 parts of Helanca knitted fabric are dyed in 500 parts of an aqueous liquor which contains 2 g/l of ammonium acetate and which is adjusted to pH 5 with acetic acid. The dyes used are: 0.2% of the red dye of the formula

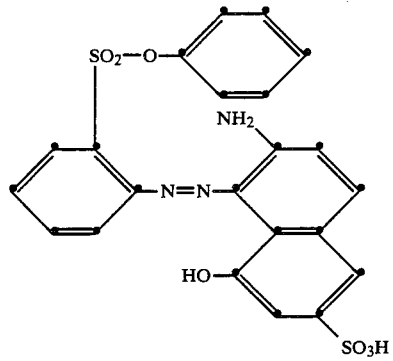

0.6% of the orange dye of the formula

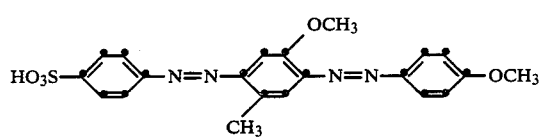

and 0.1% of the mixture of blue dyes comprising 56.6 parts of the dye of the formula

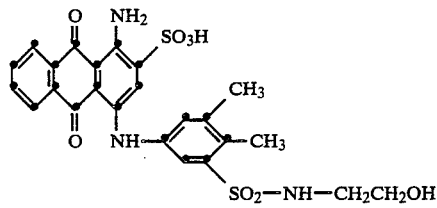

and 43.4 parts of the dye of the formula

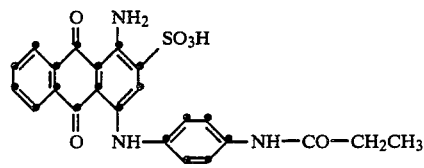

the amounts being based on the weight of the fabric.

The dyeing time at a temperature of 98° C. is 30 to 90 minutes. The dyed knitted fabric is then removed from the liquor and rinsed and dried in the usual manner. The fabric is dyed in a completely level reddish brown (henna brown) shade with no trace of material-induced barriness.

Fabrics completely levelly dyed in the indicated shade is obtained by using the red dyes and mixtures of dyes listed in the following table instead of 0.2% of the red dye of this Example, and otherwise carrying out the same procedure.

TABLE 1

| Example | Dye | Shade |
|---|---|---|
| 2 | (structure) | reddish brown |
| 3 | (structure) | reddish brown |
| 4 | (structure) | reddish brown |
| 5 | (structure) | reddish brown |
| 6 | mixture of 30 parts of the dye 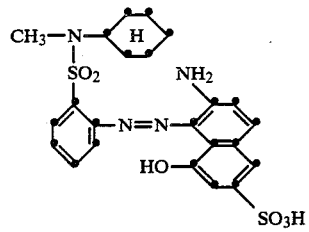 and 70 parts of the dye | reddish brown |
| 7 | mixture of 50 parts of the dye 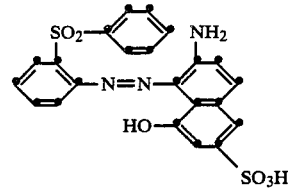 and 50 parts of the dye | reddish brown |

TABLE 1-continued

| Example | Dye | Shade |
|---|---|---|
| 8 | mixture of 50 parts of the dye [structure with CF₃, HN-CO-CH₃, N=N, NH₂, HO, SO₃H] and 50 parts of the dye [structure with CH₃-N-H, SO₂, N=N, NH₂, HO, SO₃H] | reddish brown |
| 9 | mixture of 20 parts of the dye [structure with HN-CO-CH₃, N=N, NH₂, HO, SO₃H] and 80 parts of the dye [structure with CH₃-N-H, SO₂, N=N, NH₂, HO, SO₃H] | reddish brown |
| 10 | mixture of 20 parts of the dye [structure with HN-CO-O-H, N=N, NH₂, HO, SO₃H] and 80 parts of the dye [structure with CH₃-N-H, SO, N=N, NH₂, HO, SO₃H] | reddish brown |

EXAMPLE 11

10 parts of polyamide 66 yarn are dyed in 400 parts of an aqueous liquor which contains 1.5 g/l of ammonium acetate and which is adjusted to pH 5.5 with acetic acid. The dyes used are: 0.47% of the dye of the formula

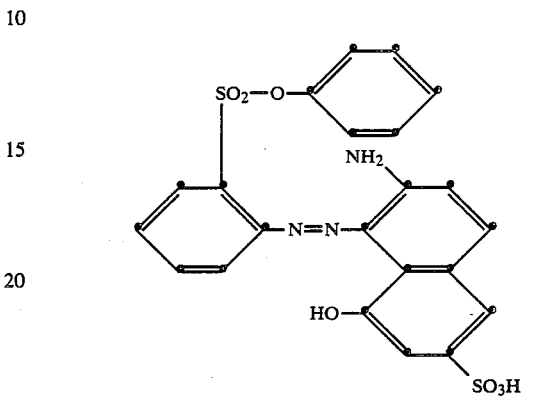

0.45% of the dye of the formula $$\text{[structure: } SO_3H\text{-phenyl-}N=N\text{-phenyl(}OCH_3\text{)-}N=N\text{-phenyl-}OCH_3\text{]}$$

and 0.17% of the dye of the formula

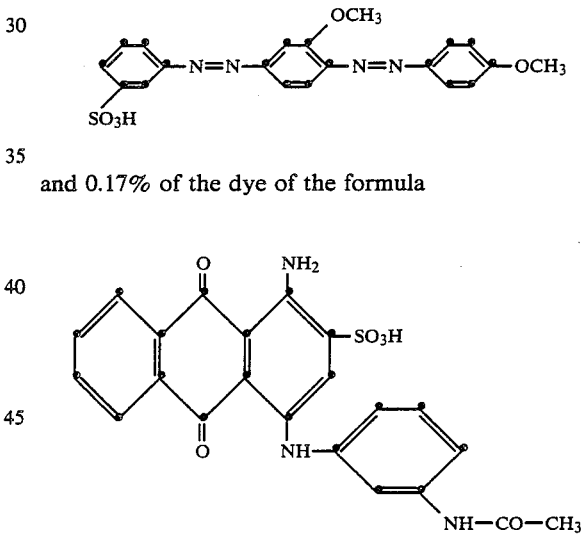

the amounts being based on the weight of the fabric. The dyebath is heated to 98° C. over the course of 30 minutes and kept for 60 minutes at 95°–98° C. The dyed yarn is then removed from the liquor and rinsed and dried in the usual manner. The yarn is dyed in a reddish brown (rust brown) shade.

EXAMPLE 12

10 parts of polyamide 66 yarn are dyed in 400 parts of an aqueous liquor which contains 1.5 g/l of ammonium acetate and which is adjusted to pH 5.5 with acetic acid. The dyes used are:

0.47% of the red dye of the formula

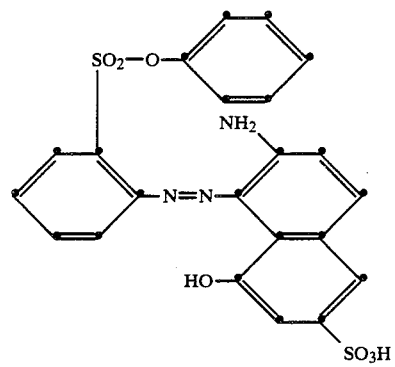

0.45% of the yellow dye of the formula

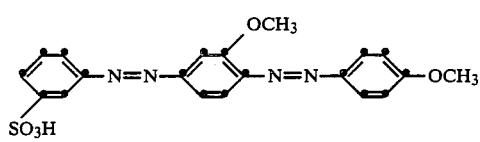

and 0.17% of the mixture of blue dyes comprising 52 parts of the dye of the formula

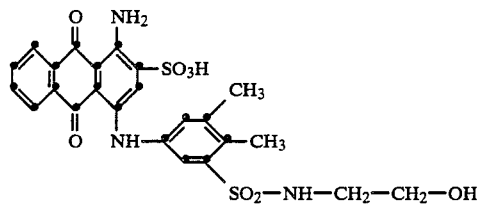

and 48 parts of the dye of the formula

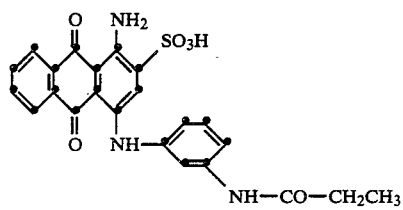

the amounts being based on the weight of the fabric. The dyebath is heated to 98° C. over the course of 30 minutes and kept for 60 minutes at 96°–98° C. The dyed yarn is then removed from the liquor and rinsed and dried in the usual manner. The yarn is dyed in a reddish brown (rust brown) shade.

Yarn completely levelly dyed in the indicated shade is obtained by using the red dyes and mixtures of dyes listed in the following Table instead of the 0.47% of red dye used in this Example, and otherwise carrying out the same procedure.

TABLE 2

| Example | Dye | Shade |
|---|---|---|
| 13 | [structure] | rust |
| 14 | [structure] | rust |
| 15 | [structure] | rust |
| 16 | [structure] | rust |
| 17 | mixture of 40 parts of the dye [structure] and 60 parts of the dye [structure] | rust |
| 18 | mixture of 20 parts of the dye [structure] and 80 parts of the dye | rust |

TABLE 2-continued

| Example | Dye | Shade |
|---------|-----|-------|
| | (structure with CH₃—N(H)SO₂-phenyl-N=N-naphthyl(NH₂)(OH)(SO₃H)) | |
| 19 | mixture of 50 parts of the dye (CF₃, HN-CO-CH₃ substituted phenyl-N=N-naphthyl(NH₂)(OH)(SO₃H)) and 50 parts of the dye (CH₃—N(H)SO₂-phenyl-N=N-naphthyl(NH₂)(OH)(SO₃H)) | rust |
| 20 | mixture of 20 parts of the dye (HN-CO-CH₃ substituted phenyl-N=N-naphthyl(NH₂)(OH)(SO₃H)) and 80 parts of the dye (CH₃—N(H)SO₂-phenyl-N=N-naphthyl(NH₂)(OH)(SO₃H)) | rust |
| 21 | mixture of 20 parts of the dye (HN-CO-O-phenyl(H) substituted phenyl-N=N-naphthyl(NH₂)(OH)(SO₃H)) and 80 parts of the dye (CH₃—N(H)SO₂-phenyl-N=N-naphthyl(NH₂)(OH)(SO₃H)) | rust |

EXAMPLE 22

500 m² of a polyamide 66 cut-pile carped (brushed goods backed with polypropylene tape fabric) having a weight of 535 g/m² are continuously prewetted in a liquor which contains 1 g/liter of the polyadduct of 1 mole of nonylphenol and 9 moles of ethylene oxide, and then expressed to a pick-up of 40% by weight.

A dye foam having a blow ratio of 1:10 is prepared in a mixer from an aqueous liquor of the following composition:

0.45 g/l of the red dye of the formula

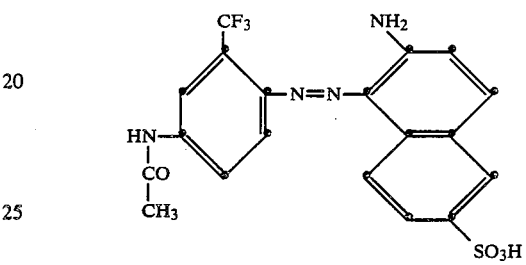

0.9 g/l of the mixture of yellow dyes comprising the dyes of the formulae

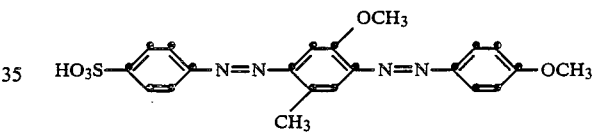

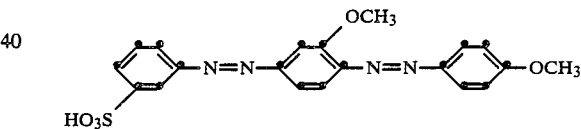

in the ratio 1:1, and
0.3 g/l of the blue dye of the formula

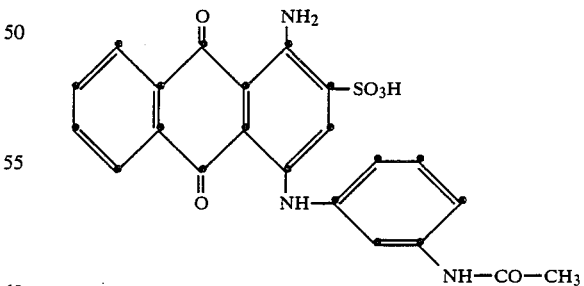

2.5 g/l of a foam stabiliser mixture consisting of coconut fatty acid diethanolamide/nonylphenol polyglycol(11) ether and sodium lauryl triglycol ether sulfate,
0.6 g/l of the oxyalkylene-siloxane copolymer of the formula

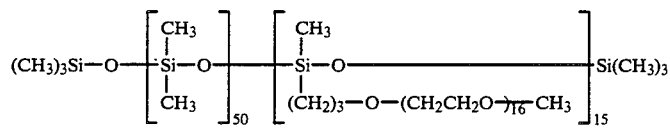

g/l of sodium acetate, and acetic acid for adjusting the pH value of the liquor to 6.

This foam is then applied from a container, equipped with a knife for adjusting the desired thickness of the foam, via an applicator roll using a carriage to the pile side of the carpet which passes through the dyeing unit at a rate of 9 m/minute. The height of the foam is 8 mm. The foam add-on is 135%.

A vacuum (~0.1 bar) is then applied to the back of the carpet in order to effect partial penetration of the layer of foam into the carpet, whereby the height of the foam is somewhat reduced. The carpet then passes over a conveyor roll into a steamer (102° C., saturated steam), where the foam rises slightly and is then collapsed. The carpet is subsequently spayed with water of 80° C., then centrifuged, and dried at 100°–130° C. in a cylindrical sieve drier.

The carpet fabric is dyed in a level beige shade with excellent penetration of the dye. The foam dyeing has a positive influence on the softness and bulk of the fabric.

Carpet material which is completely levelly dyed in the indicated shade is obtained by using the red dyes and mixtures of dyes indicated in the following table instead of 0.45 g/l of the red dye in this Example and otherwise carrying out the same procedure.

TABLE 3

| Example | Dye | Shade |
|---|---|---|
| 23 | [structure] | beige |
| 24 | [structure] | beige |
| 25 | [structure] | beige |
| 26 | [structure] | beige |
| 27 | mixture of 40 parts of the dye [structure] and 60 parts of the dye [structure] | beige |
| 28 | mixture of 30 parts of the dye [structure] and 70 parts of the dye [structure] | beige |
| 29 | mixture of 60 parts of the dye | beige |

TABLE 3-continued

| Example | Dye | Shade |
|---|---|---|
| | (structure: HN(COCH3)–C6H3(CF3)–N=N–naphthalene(NH2)(OH)(SO3H)) | |
| | and 40 parts of the dye | |
| | (structure: CH3–N(H-cyclohexyl)–SO2–C6H4–N=N–naphthalene(NH2)(OH)(SO3H)) | |
| 30 | mixture of 10 parts of the dye | beige |
| | (structure: HN(COCH3)–C6H4–N=N–naphthalene(NH2)(OH)(SO3H)) | |
| | and 90 parts of the dye | |
| | (structure: CH3–N(H-cyclohexyl)–SO2–C6H4–N=N–naphthalene(NH2)(OH)(SO3H)) | |
| 31 | mixture of 20 parts of the dye | beige |
| | (structure: HN(CO–O–cyclohexyl)–C6H4–N=N–naphthalene(NH2)(OH)(SO3H)) | |
| | and 80 parts of the dye | |
| | (structure: CH3–N(H-cyclohexyl)–SO2–C6H4–N=N–naphthalene(NH2)(OH)(SO3H)) | |

EXAMPLE 32
(Carpet printing)

A polyamide 6 cut-pile fitted carpet having a weight of 350 to 400 g/m² is impregnated on a padder with a padding liquor consisting of 988 parts of water, 10 parts of 36° Bé sodium hydroxide solution and 2 parts of wetting agent, and pinched off to a pick-up of 80%.

A dye paste of the following composition is sprayed in the form of a pattern, by means of a nozzle, onto the pretreated carpet:
942 parts of water
50 parts of thickener
3 parts of antifoam
5 parts of the red mixture comprising 30 parts of the dye of the formula

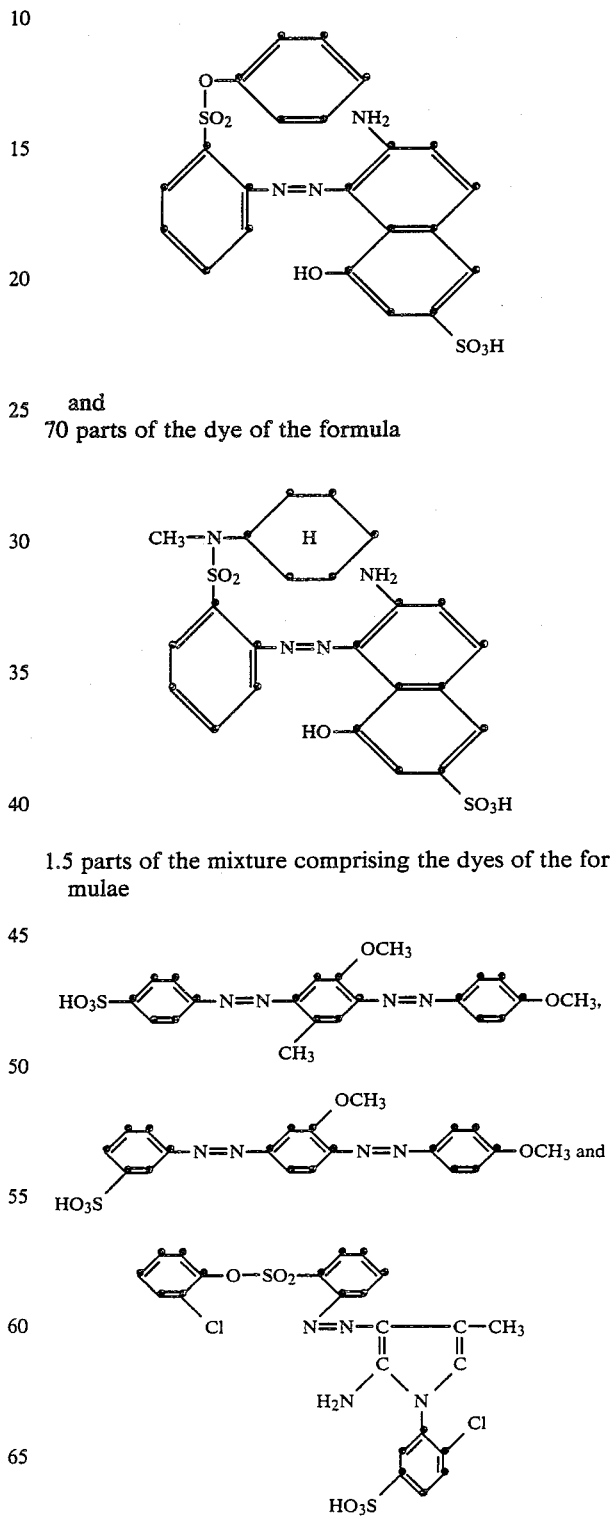

and
70 parts of the dye of the formula 1.5 parts of the mixture comprising the dyes of the formulae in the ratio 1:1:1, and
1 part of the mixture of blue dyes comprising 52 parts of the dye of the formula

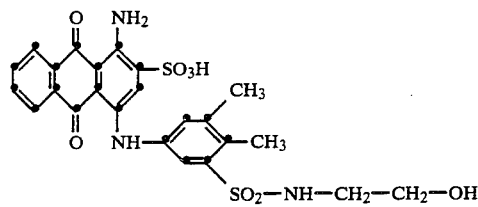

and
48 parts of the dye of the formula

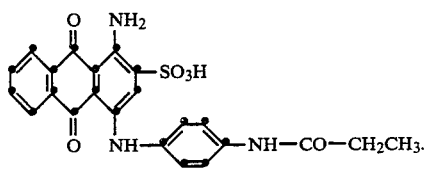

The thickener used has the following composition:
240 parts of white spirit,
50 parts of a water-in-oil emulsifier,
20 parts of an oil-in-water emulsifier,
20 parts of an antifoam,
50 parts of a crosslinked carboxyvinyl polymer having a molecular weight of approx. 4,000,000,
70 parts of a linear carboxyvinyl polymer having a molecular weight of approx. 1,000,000, and
550 parts of water,
the pH having been adjusted to a value of 4.5 with acetic acid.

The material which has been sprayed with the dye paste is then treated with saturated steam at 101° C. for 5 minutes in order to fix the dyes, then rinsed, neutralised, rinsed again and dried.

A bordeaux pattern with very sharp contours is obtained on the cut-pile fitted carpet. Dye penetration is very good and there is absolutely no frosting.

EXAMPLE 33

(Continuous carpet dyeing)

2.7 parts of the yellow dyestuff mixture of Example 32, 1.2 parts of the red dye of Example 1 and 1.3 parts of the mixture of blue dyes of Example 32 are dissolved in 100 parts of water by brief boiling. This solution is then added to a solution containing 3 parts of a thickener based on locust bean gum, 5.0 parts of a coacervate-forming padding assistant based on a condensation product of a higher-molecular fatty acid with an oxyalkylamine, 2.0 parts of crystalline monosodium phosphate and 1.0 part of crystalline disodium phosphate in 500 parts of cold water. The mixture is then bulked to 1000 parts with cold water. 300% (based on the weight of carpet) of this liquor, which has a pH value of 5.5 to 6.5, are then applied to a polyamide tufted undyed carpet, at a carpet speed of 8 meters per minute. The impregnated carpet is passed into a festoon steamer, where it is treated for 10 minutes with saturated steam at 98° to 100° C. The carpet is then washed in an open width washing machine. It is dyed in a neutral brown shade.

Carpets which are completely levelly dyed in the indicated shade are obtained by using the dyes and dyestuff mixtures in Table 4 instead of 5 parts of the red dye employed in this Example and otherwise carrying out the same procedure.

TABLE 4

| Example | Dye | Shade |
|---|---|---|
| 34 | [structure] | bordeaux |
| 35 | [structure] | bordeaux |
| 36 | [structure] | bordeaux |
| 37 | [structure] | bordeaux |
| 38 | mixture of 50 parts of the dye [structure] and 50 parts of the dye [structure] | bordeaux |
| 39 | mixture of 50 parts of the dye [structure] | bordeaux |

TABLE 4-continued

| Example | Dye | Shade |
|---|---|---| and 50 parts of the dye

[Structure: CH3CH2-N(SO2)-phenyl-N=N-naphthyl(NH2)(OH)(SO3H)]

| 40 | mixture of 80 parts of the dye | bordeaux |

[Structure: CH3-CO-NH-phenyl(CF3)-N=N-naphthyl(NH2)(OH)(SO3H)]

20 parts of the dye

[Structure: CH3CH2-N(SO2)-phenyl-N=N-naphthyl(NH2)(OH)(SO3H)]

| 41 | mixture of 20 parts of the dye | bordeaux |

[Structure: CH3-CO-NH-phenyl-N=N-naphthyl(NH2)(OH)(SO3H)]

and 80 parts of the dye

[Structure: CH3CH2-N(SO2)-phenyl-N=N-naphthyl(NH2)(OH)(SO3H)]

| 42 | mixture of 20 parts of the dye | bordeaux |

[Structure: phenyl-O-CO-NH-phenyl-N=N-naphthyl(NH2)(OH)(SO3H)]

and 80 parts of the dye

---

TABLE 4-continued

| Example | Dye | Shade |
|---|---|---|

5

[Structure: CH3CH2-N(SO2)-phenyl-N=N-naphthyl(NH2)(OH)(SO3H)]

EXAMPLE 43

The procedure of Example 11 is repeated, except that 0.17% of the blue dye of the formula

[Structure: anthraquinone with NH2, SO3H, and NH-(2,6-dimethylphenyl-SO2-NH-CH2-CH2-OH) substituents]

is used instead of 0.17% of the blue dye of the formula indicated in Example 11. The yarn is dyed in a reddish brown (rust brown) shade.

EXAMPLE 44

(Continuous wool dyeing)

A woollen material is padded with a liquor containing 0.3 part of the dyestuff mixture of Example 22, 11.0 parts of the red dyestuff mixture of Example 6, 10.0 parts of the blue dyestuff mixture of Example 1, 2.0 parts of an alginate thickener, 22.0 parts of a coacervate-forming padding agent based on a condensation product of a higher-molecular fatty acid with a hydroxyalkylamine, and 8.0 parts of 80% formic acid in 1000 parts of water. The pick-up is 85%, based on the weight of the wool. The material is then steamed for 15 minutes in saturated steam at 98° to 100° C. and then washed.

A level violet dyeing is obtained.

EXAMPLE 45

The procedure of Example 11 is repeated, except that 0.46% of the yellow dye of the formula

[Structure: phenyl(SO3H)-N=N-phenyl(OCH3)-N=N-phenyl(CH3)-OCH2CH2OH]

is used instead of 0.45% of the yellow dye of the formula indicated in Example 11. The yarn is dyed in a reddish brown shade.

What is claimed is:

1. A process for dyeing or printing natural and synthetic polyamide material by the trichromatic technique, which comprises the use of a red dye of the formula

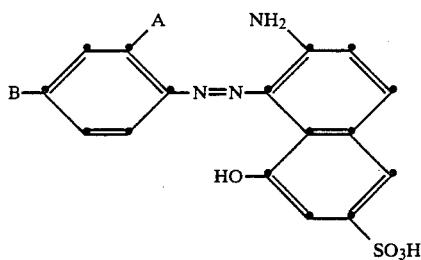

wherein A is hydrogen, unsubstituted or substituted $C_1$–$C_4$alkyl,

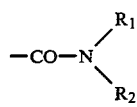

or —$SO_2R_3$, wherein $R_1$ is $C_1$–$C_4$alkyl, $R_2$ is unsubstituted or substituted $C_5$–$C_7$cycloalkyl or unsubstituted or substituted phenyl, and $R_3$ is unsubstituted or substituted phenyl or unsubstituted or substituted phenoxy, and B is hydrogen, $C_2$–$C_4$alkanoylamino, $C_5$–$C_8$cycloalkoxycarbonylamino, $C_1$–$C_4$alkoxycarbonylamino, $C_1$–$C_4$alkylsulfonylamino or unsubstituted or substituted phenylsulfonylamino, or a mixture of the red dye of the formula (1) with a red dye of the formula

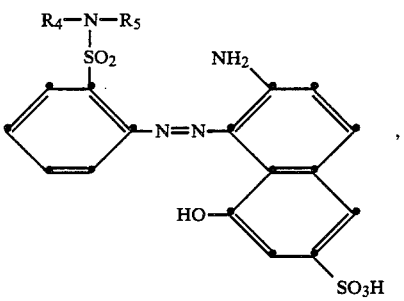

wherein $R_4$ is methyl or ethyl and $R_5$ is cyclohexyl or phenyl, together with at least one yellow or orange dye of the formula

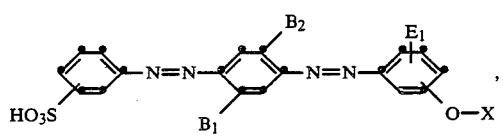

wherein $B_1$, $B_2$ and $E_1$ are hydrogen, $C_1$–$C_4$alkyl or $C_1$–$C_4$alkoxy, and X is straight chain or branched $C_1$–$C_4$alkyl or straight chain or branched $C_2$–$C_4$hydroxyalkyl, or a mixture of at least one yellow or orange dye of the formula (3) with a yellow dye of the formula

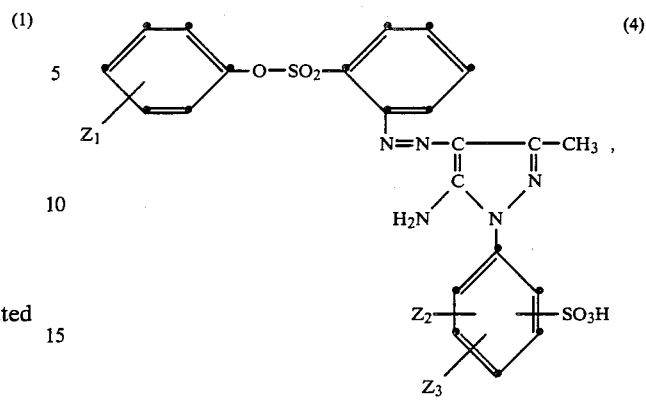

wherein $Z_1$, $Z_2$ and $Z_3$ are each independently hydrogen, halogen, $C_1$–$C_4$alkyl or $C_1$–$C_4$alkoxy, and at least one blue dye of the formula

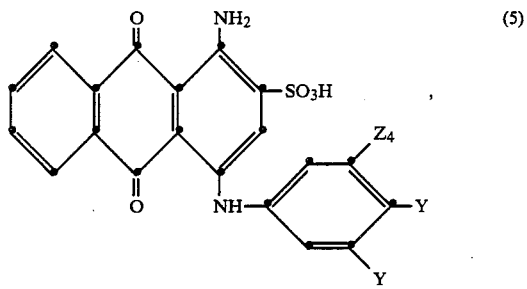

wherein one Y is hydrogen or methyl and the other Y is $C_2$–$C_4$alkanoylamino or $C_2$–$C_4$hydroxyalkylsulfamoyl and $Z_4$ is hydrogen or methyl.

2. A process according to claim 1, which comprises the use of a red dye of the formula (1), wherein A is hydrogen, methyl, trifluoromethyl,

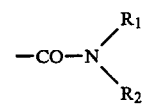

or —$SO_2R_3$, in which $R_1$ is methyl or ethyl, $R_2$ is cyclohexyl or phenyl, and $R_3$ is phenyl, methylphenyl, phenoxy or chlorophenoxy, and B is hydrogen, acetylamino, propionylamino, cyclohexyloxycarbonylamino, phenylsulfonylamino or methylphenylsulfonylamino, with the proviso that A and B together are not both hydrogen.

3. A process according to claim 2, which comprises the use of a red dye of the formula (1), wherein A and B are as defined in claim 2, together with the red dye of the formula

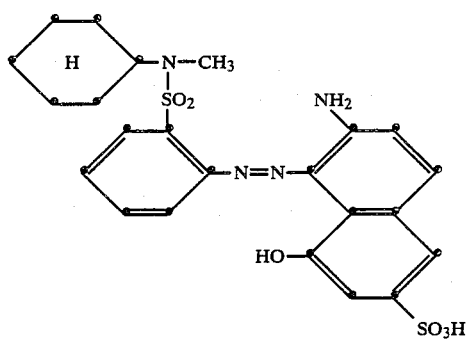
(6)

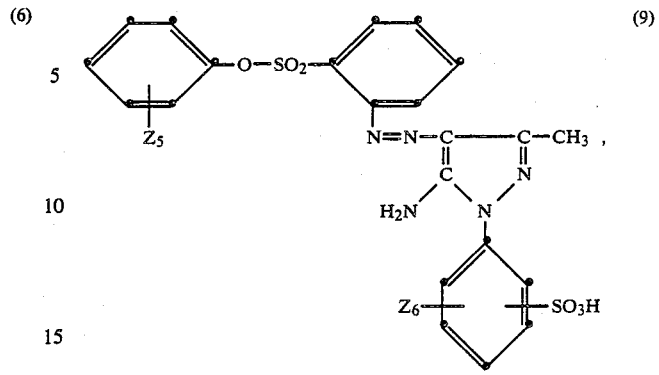
(9)

4. A process according to claim 2, which comprises the use of a red dye of the formula (1), wherein A and B are as defined in claim 2, together with the red dye of the formula

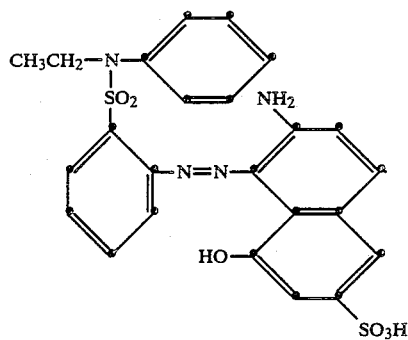
(7)

wherein $Z_5$ and $Z_6$ are each independently hydrogen, methyl or chlorine.

8. A process according to claim 7, which comprises the use of the yellow dye of the formula

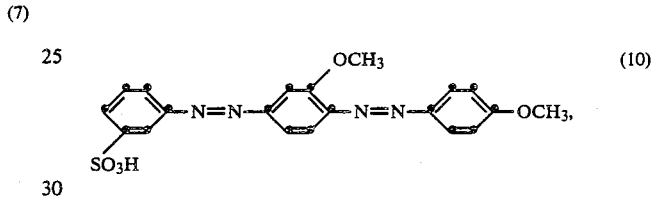
(10)

a mixture of the yellow dye of the formula (10) with the orange dye of the formula

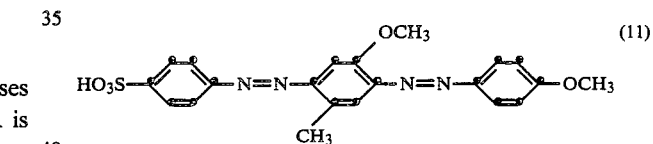
(11)

5. A process according to claim 2, which comprises the use of a red dye of the formula (1), wherein A is hydrogen, phenylsulfonyl, phenoxysulfonyl or trifluoromethyl, and B is hydrogen, acetylamino or cyclohexyloxycarbonylamino.

6. A process according to claim 5, which comprises the use of a red dye of the formula (1), wherein A is hydrogen and B is acetylamino or cyclohexyloxycarbonylamino, or A is trifluoromethyl and B is acetylamino, or A is phenylsulfonyl or phenoxysulfonyl and B is hydrogen.

7. A process according to claim 1, which comprises the use of at least one yellow or orange dye of the formula or a mixture of the dyes of the formulae (10) and (11) with the dye of the formula

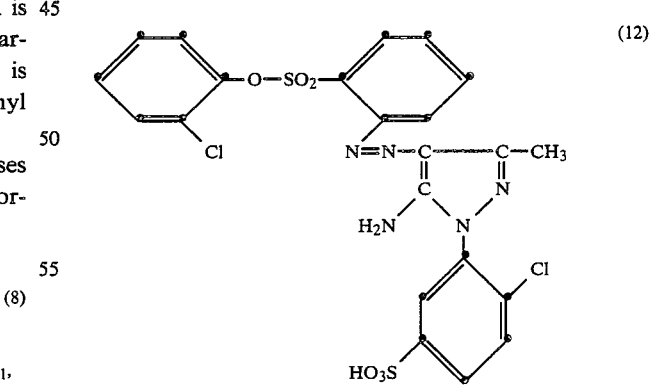
(12)

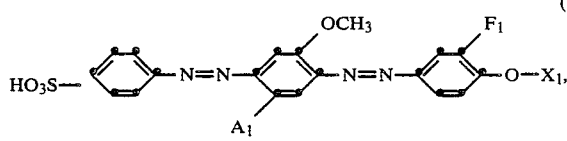
(8)

wherein $A_1$ is hydrogen or methyl, $F_1$ is hydrogen or methyl and $X_1$ is methyl, ethyl, $\beta$-hydroxyethyl, $\beta$-hydroxypropyl, $\beta$-hydroxybutyl or $\alpha$-ethyl-$\beta$-hydroxyethyl, or a mixture of at least one dye of the formula (8) and a yellow dye of the formula the ratio of the dyes of the formulae (10) and (11) being 60:40 to 40:60: and preferably 1:1, and the ratio of the dyes of the formulae (10), (11) and (12) being 60:20:20, 20:60:20 to 20:20:60 and preferably 1:1:1.

9. A process according to claim 1, which comprises the use of a blue dye of the formula

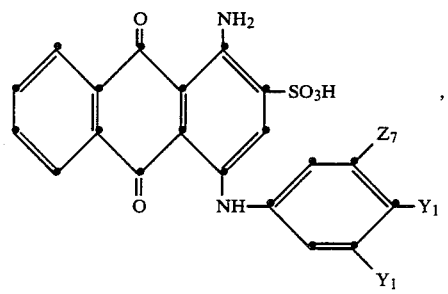

(13)

wherein one $Y_1$ is hydrogen or methyl and the other $Y_1$ is acetylamino, propionylamino or $C_2$-$C_4$hydroxyalkylsulfamoyl, and $Z_7$ is hydrogen or methyl, or a mixture of the blue dyes of the formulae

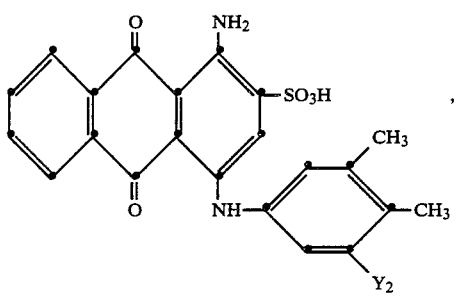

(14)

wherein $Y_2$ is a $C_2$-$C_4$hydroxyalkylsulfamoyl radical, and

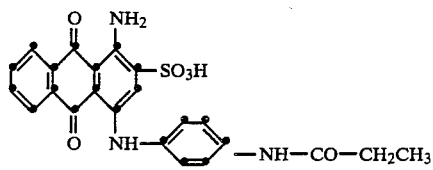

(15)

10. A process according to claim 9, which comprises the use of a blue dye of the formulae

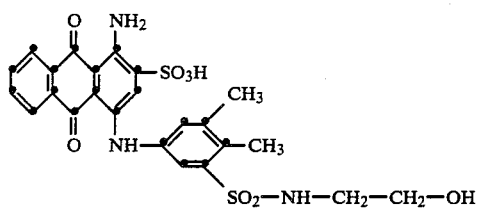

(16)

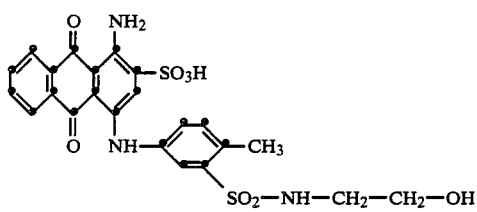

(17)

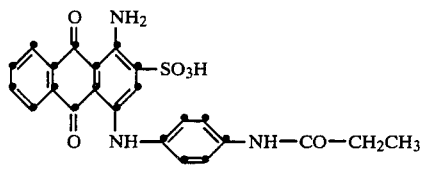

(18)

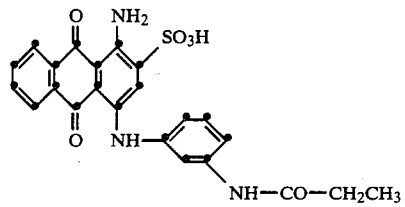

(19)

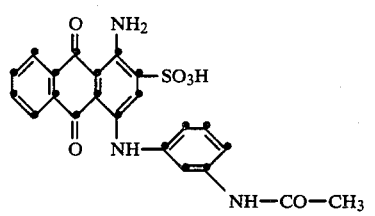

(20)

or a mixture of a dye of the formulae (16) or (17) with a dye of the formula (18) or (19).

11. A process according to claim 1, which comprises the use of a red dye of the formula (1), wherein A is hydrogen and B is acetylamino or cyclohexyloxycarbonylamino, or A is trifluoromethyl and B is acetylamino, or A is phenylsulfonyl or phenoxysulfonyl and B is hydrogen, optionally in admixture with a red dye of the formula (2), wherein $R_4$ is methyl and $R_5$ is cyclohexyl, or $R_4$ is ethyl and $R_5$ is phenyl, together with the yellow dye of the formula (10)

![Formula 10: benzene-SO3H linked by N=N to benzene with OCH3, linked by N=N to benzene with two OCH3 groups]

(10)

or with a mixture of the yellow dye of the formula (10) and of the orange dye of the formula (11), ![Formula 11: HO3S-benzene linked by N=N to benzene with OCH3 and CH3, linked by N=N to benzene with OCH3]

(11)

or with a mixture of the dyes of the formulae (10) and (11) with the dye of the formula (12),

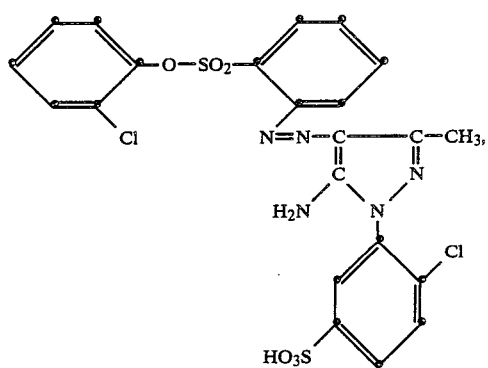 (12)

the ratio of the dyes of the formulae (10) to (12) being 1:1 or 1:1:1, and with one of the blue dyes of the formulae

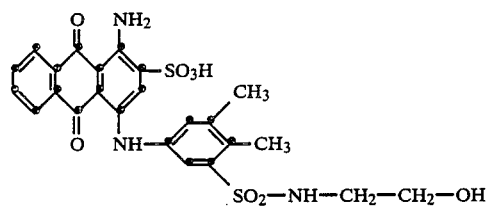 (16)

and

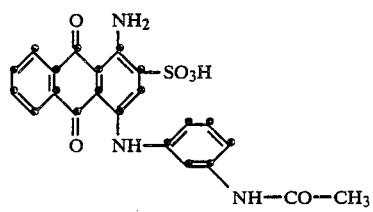 (20)

or with a mixture of the blue dye of the formula (16) with a dye of the formula

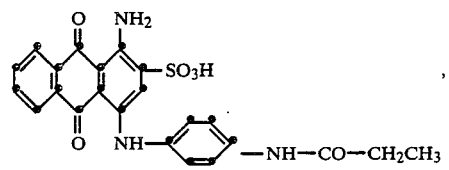 (15)

the ratio of the dyes of the formulae (16) and (15) being 60:40 to 40:60.

12. A process according to claim 1, which comprises the use of a red dye of the formula (1), wherein A is trifluoromethyl and B is acetylamino, together with the yellow dye of the formula

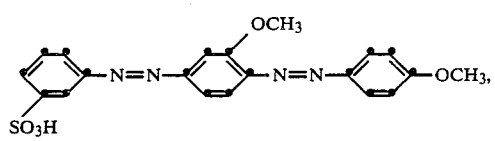 (10)

or with the orange dye of the formula

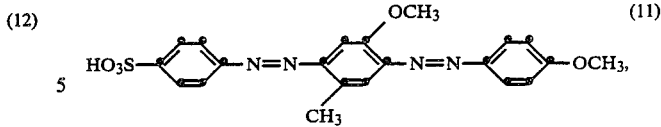 (11)

or with a mixture of the dyes of the formulae (10) and (11) with the dye of the formula

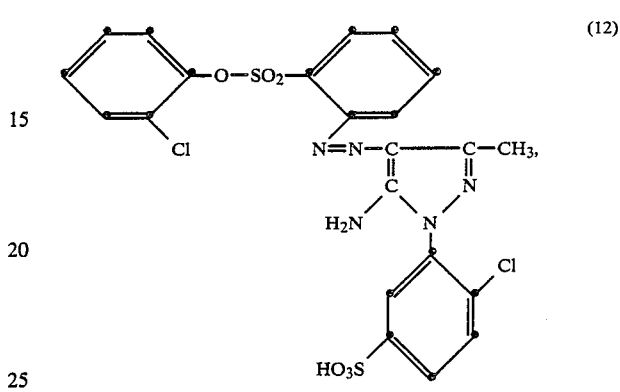 (12)

the ratio of the dyes of the formulae (10) to (12) being 1:1:1, and with one of the blue dyes of the formulae

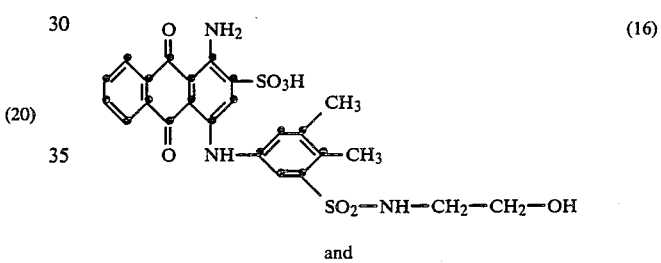 (16)

and

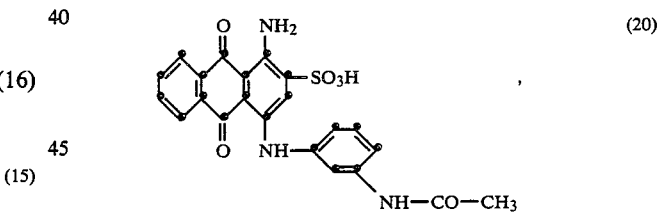 (20)

or with a mixture of the blue dye of the formula (16) with the blue dye of the formula

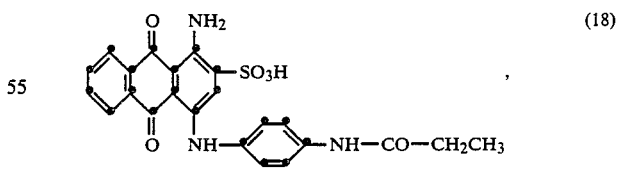 (18)

the ratio of the dyes of the formulae (16) and (18) being 60:40 to 40:60.

13. A process according to claim 1 for dyeing or printing material made from natural and synthetic polyamide by the trichromatic technique, which process comprises treating said material with a dye liquor or printing paste which contains the dyestuff mixture according to claim 1, together with water and optionally further auxiliaries.

14. An aqueous dye liquor or printing paste which contains the dyestuff mixture according to claim 1 and optionally further auxiliaries.

15. A material dyed or printed by the process according to claim 13.

16. A polyamide material dyed or printed according to claim 15.

17. A dyed material according to claim 15 wherein the material is a textile material.

18. A polyamide material according to claim 16 wherein the material is a polyamide carpet material.

* * * * *